C. D. TISDALE.
CAR TRUCK.

No. 44,694. Patented Oct. 11, 1864.

Witnesses;
Frederick Curtis
F. O. Hale Jr

Inventor;
Chas. D. Tisdale
by his attorney
R. H. Eddy

UNITED STATES PATENT OFFICE.

CHARLES D. TISDALE, OF EAST BOSTON, ASSIGNOR TO HIMSELF AND JOSEPH H. CLAPP, OF BOSTON, MASSACHUSETTS.

IMPROVEMENT IN CONSTRUCTION OF CAR-TRUCKS.

Specification forming part of Letters Patent No. 44,694, dated October 11, 1864.

*To all whom it may concern:*

Be it known that I, CHARLES D. TISDALE, of East Boston, in the county of Suffolk and State of Massachusetts, have invented a new and useful mechanism having reference to a railway-carriage, constructed so as to enable the two wheels of each of its axles to be moved in a direction either away from or toward each other, as circumstances may require, in order to adapt the carriage to rails and tracks of different gages; and I do hereby declare the same to be fully described in the following specification and represented in the accompanying drawings, of which—

Figure 1:
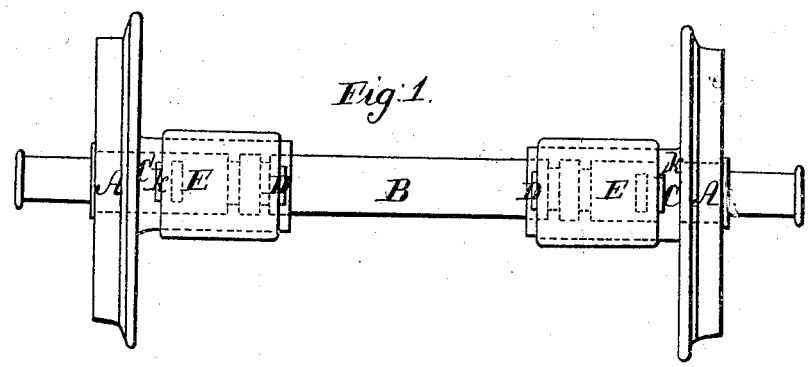
Figure 2:
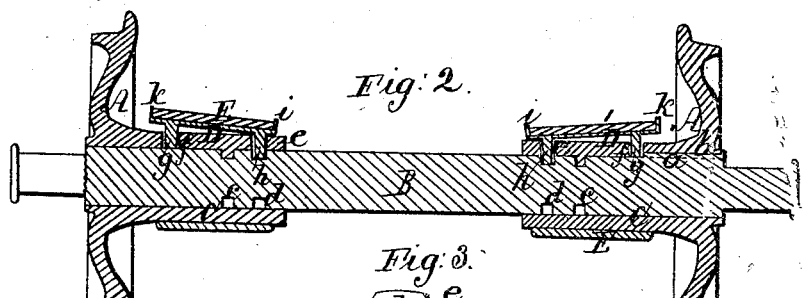
Figure 3:
Figure 4:
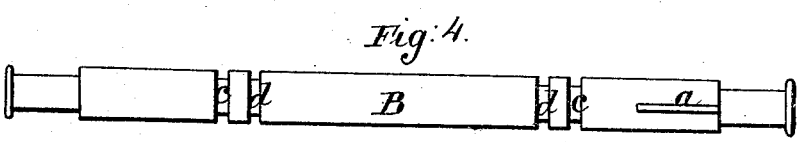
Figure 5:
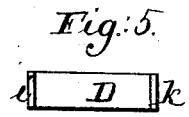
Figure 6:
Figure 7:
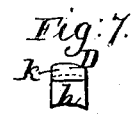

Figure 1 is a top view of an axle and two wheels provided with my invention. Fig. 2 is a longitudinal section of the same. Fig. 3 is a transverse section of one of the wheel-sleeves and the double latch and tubular spring thereof. Fig. 4 is a side view of the axle as it appears when divested of the wheels and their sleeves. Fig. 5 is a top view, and Fig. 6 a side view, and Fig. 7 an end view, of the double-latch, to be hereinafter described.

My invention is a new mechanism for locking each of the wheels of a railway-carriage in either of its positions on the axle, whether for the track of one gage or for another of a different gage or width between the two rails of such track.

For carrying out my invention, each or either of the wheels A A should be applied to the axle B by means of a sleeve or tubular shaft, C, having the wheel fixed to it and at or near one end of it. This sleeve encompasses the axle B. The wheel A, with its sleeve C, should be capable of being slid longitudinally on the axle. One of the sleeves C and the axle may have a "feather-connection," in order to prevent the sleeve and wheel from revolving on and independently of the axle. If preferable, there may be a feather-connection to each of the sleeves and the axle. When one sleeve only has the feather-connection applied to it and the axle, the other sleeve and wheel will be free to revolve faster than the axle, in order that the revolutions of one of the two wheels may be independent of the other while the wheels may be traveling on a curved track. Such a feather-connection consists of a tongue or rib, *a*, and a corresponding groove, *b*, the said tongue being caused to project from the axle and into the groove made in the sleeve.

In carrying out my invention I form the axle where it is to be within each of the sleeves with two annular grooves, *c d*, going transversely around it. I also make the sleeve with two openings, *e f*, leading through it, and arranged as shown in Fig. 2. These openings are intended to receive the projections *g h* of a double latch, D, which consists of a bar or plate of metal provided with two studs or projections, *g h*, extending from it, as shown in the drawings.

An elastic tube or band, E, formed of vulcanized india-rubber, embraces the sleeve C and the latch D, the said latch being provided with two ears, *i k*, to keep the latch in proper connection with the band. These ears are also to enable either end of the latch D to be raised or moved away from the axle by means of a pry or lever inserted between the ear and the sleeve and forced against the ear.

By so raising up the latch as to draw the projection *g* out of the groove *c* and putting a block or wedge between the sleeve and the ear *i* the sleeve will be free to be moved inward on the axle. By so moving it until the projection *h* may be directly over the groove *d*, the contractile spring or power of the band B will force the projection *h* down into the groove *d*, in which case the wheel will be set for running on the narrower gage track, and the projection *g* will rest on the outer surface of the axle. If after this we raise the projection *h* out of the groove *d* and block up that end of the double latch to which such projection appertains, we shall be able to move the sleeve outward on the axle until the projection *g* may meet and be forced into the groove *c*, which having taken place, the wheel will be adjusted for the wider track.

When the two tracks are united by a connection-track of two rails gradually approaching each other as they run from the wider to the narrower track, the approaching rails will serve to move the wheels from one position to the other on the axle to adapt them to either track.

Preparatory to the entrance of the wheels on the connection-track, the double catch for each sleeve is to be raised and blocked up at the proper end, in which case both of the projections *g h* will be out of the grooves *d e*, and thus the wheels will be free to slide on the axle, and while moving on the communication track the wheels will be gradually moved by it longitudinally on the axle until the advanced track is entered on. As soon as this takes place, the unblocked stud of the double catch, by the collapsing-power of the spring E, will be forced into the groove of the axle, and thus lock the wheel in its proper position on the axle for running on the advanced track. But one groove, *d* or *e*, is essential to my invention, as the studs *g h* may alternately enter it; but I prefer to have two of them, as it enables the double catch to be made longer than it otherwise could be, and to operate in some respects to better advantage.

I claim—

The new or improved wheel-locking mechanism or combination, consisting of the double catch D, the elastic band E, and either one or two grooves, *c d*, and applied to the wheel, sleeve, and axle, and so as to operate therewith, subtantially as herein specified.

C. D. TISDALE.

Witnesses:
R. H. EDDY,
F. P. HALE, Jr